United States Patent
Dasgupta et al.

(10) Patent No.: US 10,970,122 B2
(45) Date of Patent: *Apr. 6, 2021

(54) OPTIMIZING ALLOCATION OF MULTI-TASKING SERVERS

(71) Applicant: International Business Machines Corporation, Armonk, NY (US)

(72) Inventors: Gargi B. Dasgupta, Gurgaon (IN); Sakib A. Mondal, Bangalore (IN); Renuka R. Sindhgatta, Bangalore (IN); Rodney B. Wallace, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,630

(22) Filed: Jul. 30, 2019

(65) Prior Publication Data

US 2019/0354404 A1 Nov. 21, 2019

Related U.S. Application Data

(63) Continuation of application No. 14/663,491, filed on Mar. 20, 2015, now Pat. No. 10,452,450.

(51) Int. Cl.
*G06F 9/50* (2006.01)
*H04L 12/24* (2006.01)

(52) U.S. Cl.
CPC ........ *G06F 9/505* (2013.01); *G06F 2209/501* (2013.01); *H04L 41/5074* (2013.01)

(58) Field of Classification Search
CPC . G06F 9/505; G06F 2209/501; H04L 41/5074
See application file for complete search history.

(56) References Cited

U.S. PATENT DOCUMENTS

| 5,325,292 A | 6/1994 | Crockett |
| 6,622,221 B1 | 9/2003 | Zahavi |

(Continued)

FOREIGN PATENT DOCUMENTS

| CN | 202261335 U | 5/2012 |
| CN | 105988879 A | 10/2016 |

OTHER PUBLICATIONS

"Simulation", (n.d.), Collins English Dictionary—Complete & Unabridged 10th Edition, Retrieved Jan. 8, 2018 from Dictionary.com, website <http://www.dictionary.com/browse/simulation>.

(Continued)

*Primary Examiner* — Azizul Choudhury
(74) *Attorney, Agent, or Firm* — Haley J. McClory

(57) ABSTRACT

Optimizing allocation of multi-tasking servers is provided. A schedule that identifies a plurality of time periods is received. The schedule associates each server of a plurality of servers with at least one time period. Performance characteristics, including a multitasking threshold, of each server of the plurality of servers is determined. A simulation of the plurality of servers is performed to determine a service level of the simulation. A workload identifying a plurality of incidents is received. Each incident is allocated to a server. One or more performance metrics of each time period is determined. The service level of the simulation is determined based, at least in part, on the one or more performance metrics of each time period. The schedule is optimized based, at least in part, on at least one of the service level and a target service level.

18 Claims, 5 Drawing Sheets

(56) References Cited

U.S. PATENT DOCUMENTS

| | | | |
|---|---|---|---|
| 7,302,685 B2 | 11/2007 | Binns | |
| 7,421,694 B2 * | 9/2008 | Gosalia | G06F 9/4843 718/104 |
| 7,725,339 B1 | 5/2010 | Aykin | |
| 8,612,272 B1 | 12/2013 | Aykin | |
| 8,650,326 B2 | 2/2014 | Rangegowda | |
| 8,719,067 B2 | 5/2014 | Fama | |
| 8,990,376 B1 | 3/2015 | Becker | |
| 9,037,703 B1 | 5/2015 | Wu | |
| 9,411,636 B1 | 8/2016 | Ting et al. | |
| 2004/0267897 A1 | 12/2004 | Hill | |
| 2005/0086335 A1 | 4/2005 | Liu | |
| 2006/0059253 A1 | 3/2006 | Goodman | |
| 2006/0259621 A1 | 11/2006 | Ranganathan | |
| 2007/0074220 A1 * | 3/2007 | Edwards | H04M 3/5237 718/104 |
| 2007/0168494 A1 | 7/2007 | Liu | |
| 2007/0204271 A1 * | 8/2007 | Gaiarsa | G06F 9/45537 718/107 |
| 2008/0141048 A1 | 6/2008 | Palmer | |
| 2008/0262817 A1 | 10/2008 | Devarakonda | |
| 2009/0018879 A1 | 1/2009 | Flaxer | |
| 2009/0216910 A1 | 8/2009 | Duchesneau | |
| 2009/0240964 A1 | 9/2009 | Pfeiffer | |
| 2010/0274637 A1 | 10/2010 | Li | |
| 2011/0055168 A1 | 3/2011 | Richards | |
| 2011/0087469 A1 | 4/2011 | Kumar | |
| 2011/0126207 A1 | 5/2011 | Wipfel | |
| 2011/0145657 A1 | 6/2011 | Bishop | |
| 2011/0173626 A1 | 7/2011 | Chi | |
| 2011/0202925 A1 | 8/2011 | Banerjee | |
| 2011/0255125 A1 | 10/2011 | Gnanasambandam | |
| 2012/0054761 A1 | 3/2012 | Bagheri | |
| 2012/0089726 A1 | 4/2012 | Doddavula | |
| 2012/0124591 A1 | 5/2012 | Cadambi | |
| 2012/0197678 A1 | 8/2012 | Ristock | |
| 2012/0304186 A1 | 11/2012 | Balmin | |
| 2013/0080641 A1 | 3/2013 | Lui | |
| 2014/0023185 A1 | 1/2014 | Appel | |
| 2014/0089511 A1 | 3/2014 | McLean | |
| 2014/0122706 A1 | 5/2014 | Boerner | |
| 2014/0149591 A1 | 5/2014 | Bhattacharya | |
| 2014/0280961 A1 | 9/2014 | Martinez | |
| 2015/0039764 A1 | 2/2015 | Beloglazov | |
| 2015/0178657 A1 | 6/2015 | Kleehammer | |
| 2015/0278968 A1 | 10/2015 | Steven | |
| 2016/0019094 A1 * | 1/2016 | Habdank | G06F 9/5083 718/104 |
| 2016/0182383 A1 | 6/2016 | Pedersen | |
| 2016/0277255 A1 * | 9/2016 | Dasgupta | G06F 9/505 |
| 2016/0306680 A1 | 10/2016 | Shen et al. | |
| 2017/0012834 A1 | 1/2017 | Chan | |
| 2017/0149872 A1 | 5/2017 | Maass et al. | |

OTHER PUBLICATIONS

Diao et al., "Staffing Optimization in Complex Service Delivery Systems", 2011 7th International Conference on Network and Service Management (CNSM), pp. 1-9, IEEE Conference Publications.

IBM Appendix P, list of patents and patent applications treated as related, File Herewith, 2 pages.

Liu et al., "Queueing Network-Model Human Processor (QN-MHP): A Computational Architecture for Multitask Performance in Human-Machine Systems", ACM Transactions on Comuter-Human Interaction, vol. 13, Issue 1, Mar. 2006, pp. 37-70, © 2006 ACM.

Mazzuchi et al., "Analyzing Skill-Based Routing Call Centers Using Discrete-Event Simulation and Design Experiment", Proceedings of the 2004 Winter Simulation Conference, vol. 2, DOI: 10.1109/WSC.2004.1371534, pp. 1812-1820, IEEE Conference Publications.

Wallace et al., "A Staffing Algorithm for Call Centers with Skill-Based Routing", Manufacturing & Service Operations Management, vol. 7, No. 4 pp. 276-294 @2005 INFORMS.

* cited by examiner

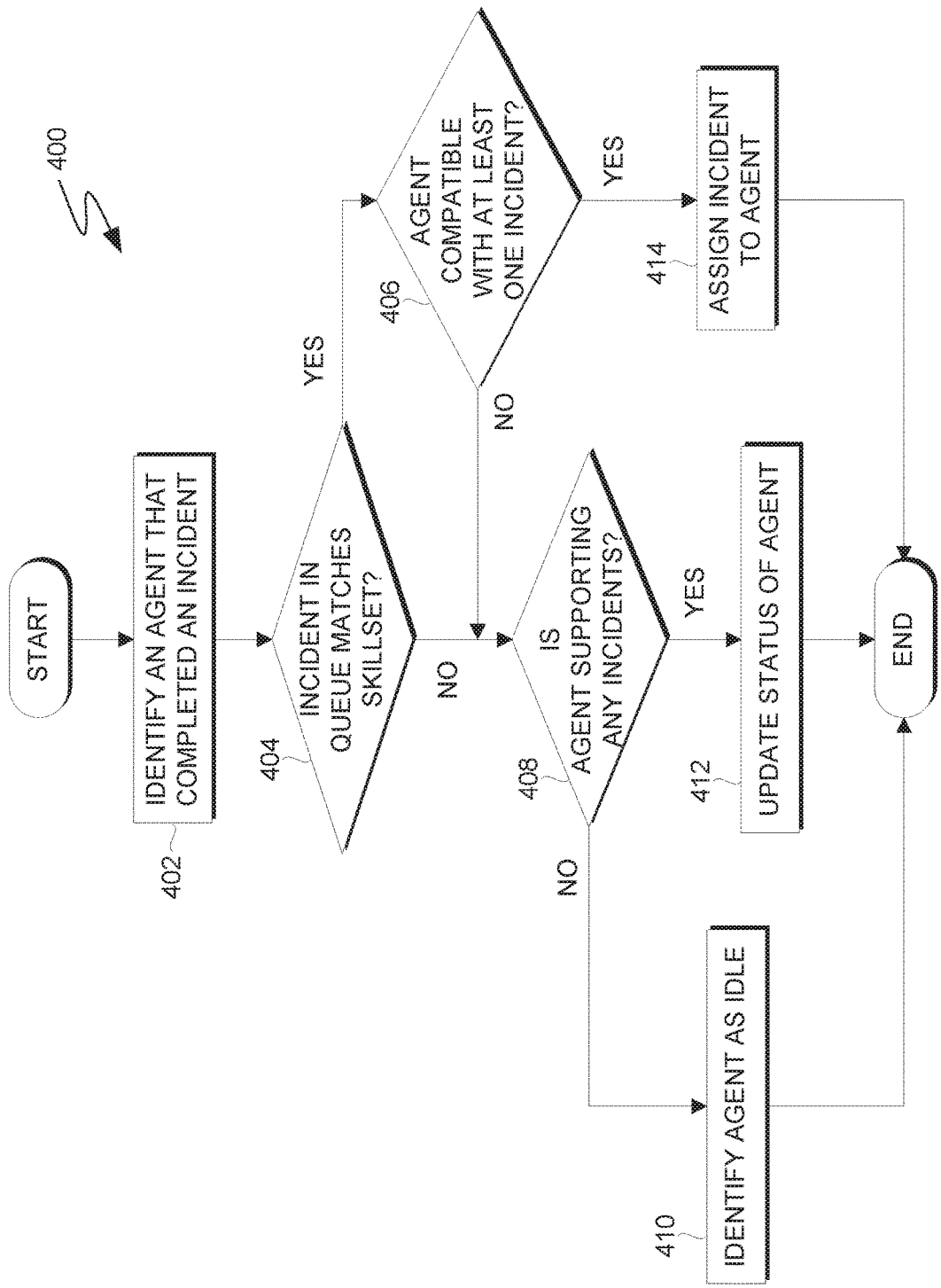

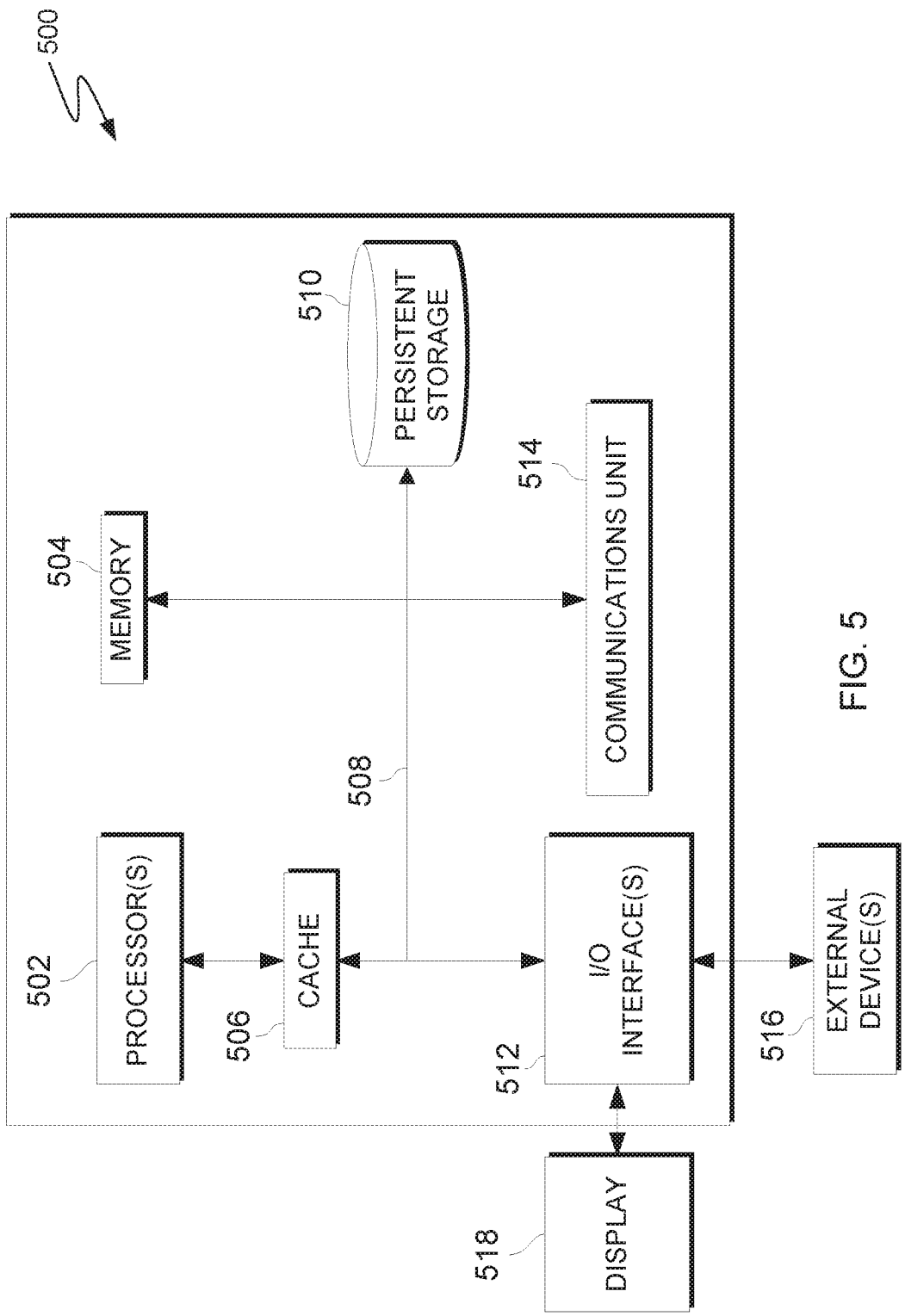

OPTIMIZING ALLOCATION OF MULTI-TASKING SERVERS

BACKGROUND OF THE INVENTION

The present invention relates generally to the field of queueing theory and more particularly to optimizing allocation of multi-skilled, multitasking servers in a service delivery environment.

Queueing theory is the mathematical study of queues. In queueing theory, a model is constructed so that queue lengths, waiting times, and other metrics can be predicted. In the context of computing, examples of queues include streaming a video, where a router queues packets of data waiting to be transmitted to another router. Another example includes a hardware component of a computer, such as a network adapter, that queues incoming or outgoing packets that are waiting to be processed or transmitted by the network adapter. Queuing theory can also be applied to service delivery.

In IT service delivery, it is extremely important to minimize disruptions to a customer's business operations. When a major outage occurs in an IT system, service providers have only a few hours or less to restore system operations or they can face severe penalties, lost revenues and potential loss of existing and future business opportunities.

Leading the effort in restoring operations to downed systems are agents who may be experienced managers and project managers called, for example, duty managers (DMs), availability managers (AMs) or major incident managers (MIMs). Thus, agents provide service by handling incidents.

SUMMARY

According to one embodiment of the present invention, a method for optimizing allocation of multi-tasking servers is provided. The method includes receiving, by one or more processors, a schedule that identifies a plurality of time periods, wherein the schedule associates each server of a plurality of servers with at least one time period; determining, by one or more processors, one or more performance characteristics of each server of the plurality of servers, wherein the one or more performance characteristics include a multitasking threshold; performing, by one or more processors, a simulation of the plurality of servers to determine a service level of the simulation by: receiving, by one or more processors, a workload identifying a plurality of incidents; allocating, by one or more processors, each incident of the plurality of incidents to a server of the plurality of servers; determining, by one or more processors, one or more performance metrics of each time period of the plurality of time periods; and determining, by one or more processors, the service level of the simulation based, at least in part, on the one or more performance metrics of each time period; and optimizing, by one or more processors, the schedule, based, at least in part, on at least one of the service level and a target service level.

According to another embodiment of the present invention, a computer program product for optimizing allocation of multi-tasking servers is provided. The computer program product comprises a computer readable storage medium and program instructions stored on the computer readable storage medium. The program instructions include program instructions to receive a schedule that identifies a plurality of time periods, wherein the schedule associates each server of a plurality of servers with at least one time period; program instructions to determine one or more performance characteristics of each server of the plurality of servers, wherein the one or more performance characteristics include a multitasking threshold; program instructions to perform a simulation of the plurality of servers to determine a service level of the simulation by: program instructions to receive a workload identifying a plurality of incidents; program instructions to allocate each incident of the plurality of incidents to a server of the plurality of servers; program instructions to determine one or more performance metrics of each time period of the plurality of time periods; and program instructions to determine the service level of the simulation based, at least in part, on the one or more performance metrics of each time period; and program instructions to optimize the schedule, based, at least in part, on at least one of the service level and a target service level.

According to another embodiment of the present invention, a computer system for optimizing allocation of multi-tasking servers is provided. The computer system includes one or more computer processors, one or more computer readable storage media, and program instructions stored on the computer readable storage media for execution by at least one of the one or more processors. The program instructions include program instructions to receive a schedule that identifies a plurality of time periods, wherein the schedule associates each server of a plurality of servers with at least one time period; program instructions to determine one or more performance characteristics of each server of the plurality of servers, wherein the one or more performance characteristics include a multitasking threshold; program instructions to perform a simulation of the plurality of servers to determine a service level of the simulation by: program instructions to receive a workload identifying a plurality of incidents; program instructions to allocate each incident of the plurality of incidents to a server of the plurality of servers; program instructions to determine one or more performance metrics of each time period of the plurality of time periods; and program instructions to determine the service level of the simulation based, at least in part, on the one or more performance metrics of each time period; and program instructions to optimize the schedule, based, at least in part, on at least one of the service level and a target service level.

BRIEF DESCRIPTION OF THE DRAWINGS

FIG. 4 is a flowchart depicting operations for dispatching incidents, within the computing environment of FIG. 1, in accordance with an embodiment of the present disclosure; and FIG. 5 is a block diagram of components of a computing device executing operations for optimizing allocation of multitasking servers, in accordance with an embodiment of the present disclosure.

DETAILED DESCRIPTION

In this disclosure, agents are an example of a queueing theory server. However, one of ordinary skill would appreciate that the invention is applicable in other service delivery environments. Agents, who handle incidents, have only minutes to take ownership of high severity incidents and then coordinate the effort of various skilled IT resources to support customers and create solutions to incidents in accordance with well-defined project management procedures. The agents are able to manage multiple incidents at the same time (i.e., multitask). Embodiments of the present invention recognize challenges including both effective staffing (i.e., allocation of servers) and workload assignment in light of the variety and quantity of project variables, such as, for example, agent skill sets and expertise levels, unique business requirements, and the quantity, severity and type of customer incidents.

Embodiments of the present invention recognize that planning the management of a workload and planning staffing is a complex problem, unique to each project. Organizations may determine agent staffing needs and allocate tasks manually based on historical agent performance data. However, current service delivery workload planning solutions do not provide for determining staffing that will meet all service level agreement (SLA) requirements while accounting for business constraints for a project, multi-skilled agents, and agents with multitasking capabilities.

Embodiments of the present invention provide for optimizing allocation of servers (i.e., agents). For example, some embodiments optimize allocation of multitasking servers while meeting a target SLA (or "target service level") for handling incidents. In some embodiments, optimizing the allocation of servers includes optimizing the number of servers allocated to a schedule that includes one or more time periods. Embodiments provide heuristic-based simulation of dispatching workload, using a queuing theory-type model based on agent skills, agent multitasking abilities, and business constraints. In some embodiments, simulation is based on historical data. Other embodiments provide for incident dispatching using a modified longest idle agent routing (LIAR) policy.

The flowchart and block diagrams in the Figures illustrate the architecture, functionality, and operation of possible implementations of systems, methods, and computer program products according to various embodiments of the present invention. In some alternative implementations, the functions noted in the block may occur out of the order noted in the Figures. For example, two blocks shown in succession may, in fact, be executed substantially concurrently, or the blocks may sometimes be executed in the reverse order.

The present disclosure will now be described in details with reference to the Figures.

Figure 1:
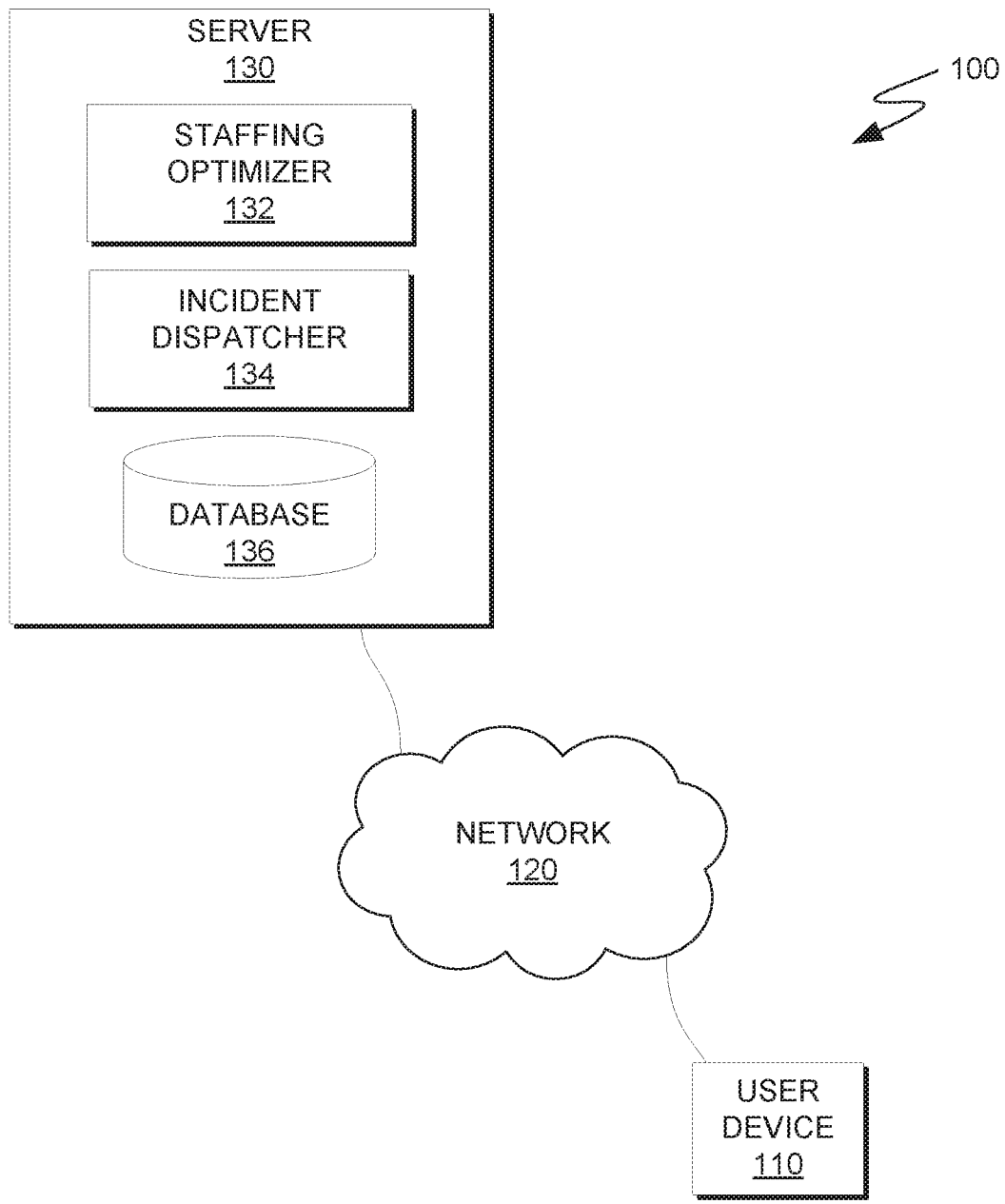
FIG. 1 is a functional block diagram illustrating a computing environment, in accordance with an embodiment of the present disclosure.

FIG. 1 is a functional block diagram illustrating a computing environment, in accordance with an embodiment of the present disclosure. For example, FIG. 1 is a functional block diagram illustrating computing environment 100. Computing environment 100 includes user device 110 and server 130 connected over network 120. Server 130 includes staffing optimizer 132, incident dispatcher 134, and database 136.

In this exemplary embodiment, staffing optimizer 132, incident dispatcher 134, and database 136 are stored on server 130. In other embodiments, one or more of staffing optimizer 132, incident dispatcher 134 and database 136 may reside on another computing device, provided that each can access user device 110 and each other. In yet other embodiments, one or more of staffing optimizer 132 and incident dispatcher 134 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between user device 110 and server 130, in accordance with a desired embodiment of the present invention.

User device 110 is a device that allows access to server 130. In various embodiments, user device 110 is a computing device that can be a standalone device, a server, a laptop computer, a tablet computer, a netbook computer, a personal computer (PC), or a desktop computer. In another embodiment, a user device 110 represents a computing system utilizing clustered computers and components to act as a single pool of seamless resources. In general, user device 110 can be any computing device or a combination of devices with access to server 130 over network 120. User device 110 may include internal and external hardware components, as depicted and described in further detail with respect to FIG. 5.

Staffing optimizer 132 operates to determine an optimized staffing schedule based on one or more input parameters. The staffing schedule allocates a plurality of agents among a plurality of time periods. Staffing optimizer 132 optimizes the staffing schedule by, in various embodiments, minimizing the number of staff members required to meet all business requirements, minimizing the number of changes made to an initial staffing schedule, or a combination thereof. As used herein, a "number" of one or more items means the count or tally of how many items are in the one or more items.

Incident dispatcher 134 operates to manage and dispatch incidents within environment 100. In one embodiment, incident dispatcher 134 assigns an incident to an agent. For example, incident dispatcher 134 assigns an incident to an available agent responsive to matching the requirements of the incident to the skills of the agent. In another embodiment, incident dispatcher 134 places an incident in a queue responsive to determining that no qualified agent is available. For example, incident dispatcher 134 determines that no qualified agents are available based on no available agents having skills that match the requirements of the incident.

Database 136 is a data repository that stores project data. Database 136 is a data repository that may be written to and read by one or both of staffing optimizer 132 and incident dispatcher 134. In various embodiments, project data includes one or more of incident data, staffing data, and performance results. The incident data describes a plurality of incidents that each have an incident arrival time and at least one incident requirement. In some embodiments, an incident of the plurality of incidents has an incident type (e.g., bridge or chat). In one embodiment, the staffing data describes at least one staffing schedule that identifies an allocation of agents to time periods. In one embodiment, the staffing data describes a plurality of agents that each have one or more performance characteristics. Performance characteristics include, for example, a set of primary skills, a set of secondary skills, and a multitasking ability. Performance results describe one or more performance metrics of a simulation. In various examples, the performance metrics include time to own (TTO), engage times, and SLA performance values. In one embodiment, the performance metrics include an achieved SLA (or "achieved service level") of a simulation iteration and a confidence interval that is derived based, at least in part, on a confidence level of the performance requirements, as discussed below. In some embodiments, the performance results include, for each time period, an achieved SLA and a utilization. In one embodiment, the performance results include an achieved SLA of a simulation iteration that is derived by aggregating the achieved SLA of each time period, and a utilization of the simulation iteration is derived by aggregating the utilization of each time period. The utilization of a time period is a measure of the number of incidents handled during the time period.

In some embodiments, the project data also includes business requirements data that describes one or more constraints or performance requirements for a simulation. In one embodiment, a performance requirement of a simulation identifies a target SLA and a confidence level. For example, to meet the requirement, the simulation must meet the target SLA within a statistical confidence interval derived according to the confidence level. In another embodiment, a constraint for a simulation identifies a maximum number of incidents of a certain type that an agent can handle. For example, a constraint may specify a maximum number of bridge incidents (i.e., phone calls) for an agent to handle concurrently. In another embodiment, a constraint of the simulation specifies a maximum number of incidents that an agent can handle concurrently.

In some embodiments, project data is based on historical data. In other embodiments, project data is derived, in whole or in part. For example, one or more values of the project data may be derived from other values of the project data. In one embodiment, an engage time is determined based, at least in part, on an arrival time of an incident and a closure time of the incident. For example, an engage time represents the elapsed time from an arrival time of an incident to a closure time of the incident. In another example, an engage time represents the elapsed time from an agent receiving an incident (e.g., based on the arrival time of the incident and a waiting time of the incident) to the closure time of the incident. In yet another example, an incident is transferred between agents, in which case the engage time is split proportionally across the agents. In another embodiment, the TTO is determined based on the total waiting time of all incidents divided by the total number of incidents. In one embodiment, staffing optimizer 132 determines the performance results based on a simulation of the agents described by the staffing data handling a workload described by the incident data. In some embodiments, the simulation is further subject to business requirements data, as described below.

In some embodiments, project data includes a multitasking threshold or capacity of each agent. The multitasking threshold of an agent is derived from performance data of the agent. In various examples, the performance data is historical performance data or performance data from a previous simulation iteration. In one embodiment, staffing optimizer 132 determines the multitasking threshold of an agent based on the number of concurrent incidents handled by the agent. For example, the multitasking threshold is an average of the number of incidents concurrently handled by an agent during each of a plurality of time periods to which the agent was allocated. In some embodiments, staffing optimizer 132 determines the multitasking threshold of an agent based on a multitasking detection algorithm. In one such embodiment, staffing optimizer 132 performs one or more simulations to determine achieved SLA for different types of work. In another embodiment, staffing optimizer 132 performs one or more simulations using different multitasking thresholds to determine performance metrics of each simulation at each multitasking threshold. Staffing optimizer 132 selects the multitasking level corresponding to the simulation with the highest achieved SLA and the multitasking level most similar to the multitasking threshold determined from historical performance data.

In some embodiments, database 136 may be written to and read by user device 110 or programs and entities outside of computing environment 100 in order to populate the repository with information relevant to the system operation, for example project data.

Figure 2:
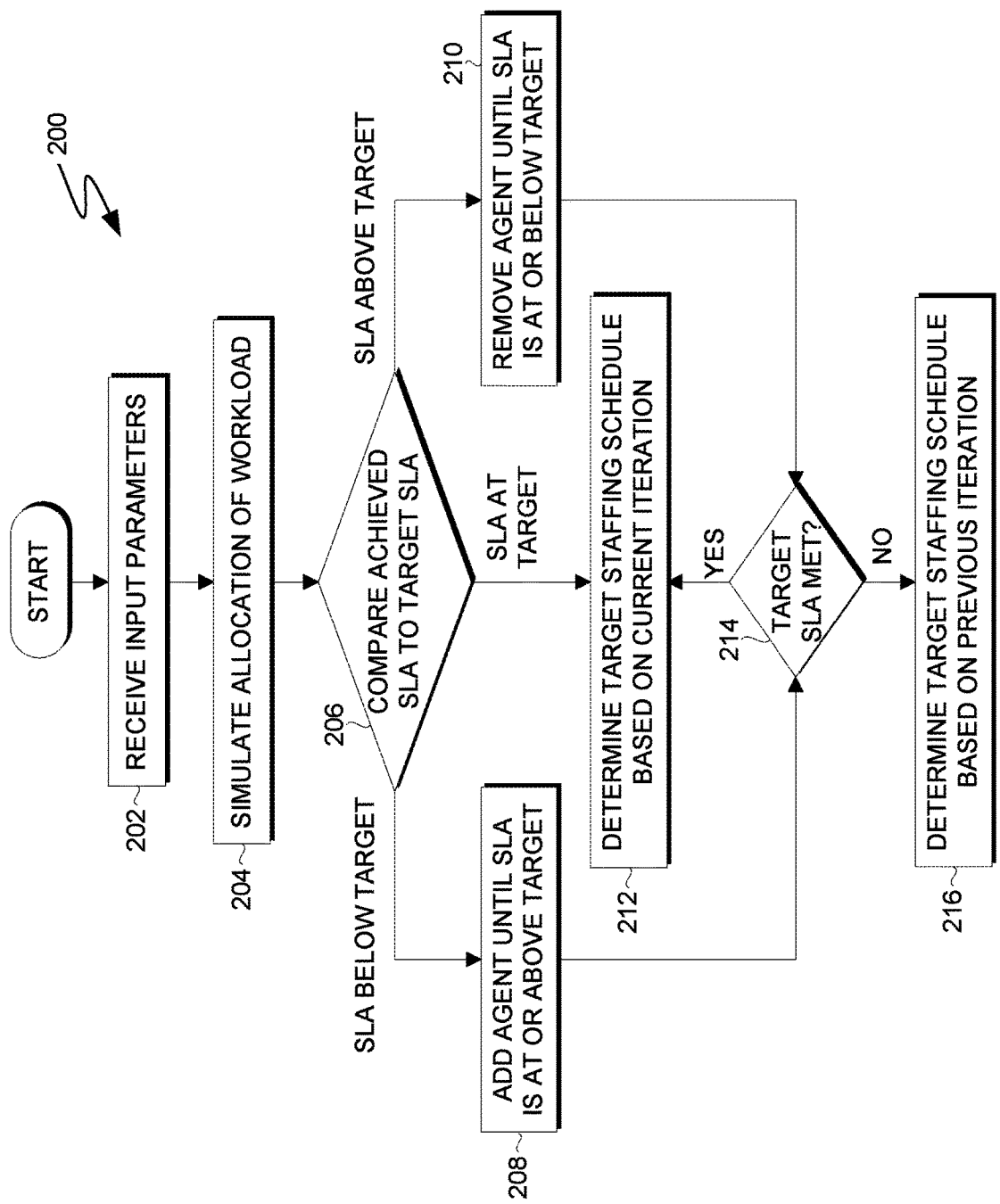
FIG. 2 is a flowchart depicting operations for optimizing staffing within the computing environment of FIG. 1, in accordance with an embodiment of the present disclosure.

FIG. 2 is a flowchart depicting operations for optimizing allocation of multi-tasking servers within the computing environment of FIG. 1, in accordance with an embodiment of the present disclosure. For example, FIG. 2 is a flowchart depicting operations 200 of staffing optimizer 132 on server 130 within computing environment 100.

In step 202, staffing optimizer 132 receives input parameters that will be utilized in simulating a work environment in which agents handle a workload of a plurality of incidents. In one embodiment, input parameters include project data. For example, staffing optimizer 132 receives project data including staffing data and incident data. In one embodiment, staffing optimizer 132 identifies an SLA value (e.g., of the input parameters) that will be used as a target SLA during workload simulation. In some embodiments, one or more of the input parameters are defined in terms of a mathematical equation or function representing a statistical distribution (e.g., a Poisson process or distribution of incident arrivals, a logarithmic service time distribution, a matrix that includes the multitasking threshold or skillsets of one or more agents). For example, an input parameter may include a distribution for each of one or more agents that represents the engage time of the agent for a plurality of incidents. In some embodiments, input parameters are integers (e.g., the number of staff members). In some embodiments, input parameters are based on historical data. In other embodiments, input parameters are based on a previous iteration of simulating the work environment.

In step 204, staffing optimizer 132 simulates allocation of a workload. Staffing optimizer 132 simulates allocation of a workload by dispatching a plurality of incidents according to arrival times of each incident. Staffing optimizer 132 distributes each incident via incident dispatcher 134, which is discussed in further detail in connection with FIGS. 3 and 4. Staffing optimizer 132 simulates allocation of the workload based on the one or more input parameters, which include at least incident data and staffing data. In one embodiment, staffing optimizer 132 simulates dispatching and processing of incidents using historical data. In one example, the historical data describes an arrival time of a plurality of incidents, a staffing schedule identifying one or more agents allocated to time periods of the schedule, and a service time distribution for each agent. In this case, staffing optimizer 132 simulates the arrival and dispatching of each incident, based on which staffing optimizer 132 determines agent performance data and the resulting SLA achievement levels. As is explained in further detail below, staffing optimizer 132 may perform multiple iterations of such a simulation. The input parameters may change or remain the same from one iteration from another. In one embodiment, staffing optimizer 132 modifies the values of one or more input parameters between simulation iterations. For example, staffing optimizer 132 may add an agent (see step 208) or remove an agent (see steps 210) between iterations. Staffing optimizer 132 determines performance results of each simulation iteration.

In decision 206, staffing optimizer 132 compares an achieved SLA to a target SLA. In one embodiment, staffing optimizer 132 compares the achieved SLA to the target SLA based on the achieved SLA of an iteration of the simulation, the target SLA identified by the performance requirements, and a confidence interval identified by the performance requirements. For example, staffing optimizer 132 determines that an achieved SLA meets a target SLA if the target SLA is within a confidence interval of the achieved SLA. In this case, if the target SLA is less than the lower bound of the confidence interval, then staffing optimizer 132 determines that the achieved SLA is above the target SLA (decision 206, SLA ABOVE TARGET branch). Further, if the target SLA is greater than the upper bound of the confidence interval, then staffing optimizer 132 determines that the achieved SLA is below the target SLA (decision 206, SLA BELOW TARGET branch).

If staffing optimizer 132 determines that the achieved SLA is less than the target SLA (decision 206, SLA BELOW TARGET branch), then staffing optimizer 132 adds an agent to the staffing schedule and reiterates the simulation until the achieved SLA is at or above the target SLA (step 208). If staffing optimizer 132 determines that the achieved SLA meets the target SLA (decision 206, SLA AT TARGET branch), then staffing optimizer 132 determines the target staffing data based on the current iteration of the simulation (step 212). If staffing optimizer 132 determines that the achieved SLA is greater than the target SLA (decision 206, SLA ABOVE TARGET branch), then staffing optimizer 132 removes an agent from the staffing schedule and reiterates the simulation until the achieved SLA is at or below the target SLA (step 210).

In step 208, staffing optimizer 132 adds an agent to the staffing schedule and reiterates the simulation until the achieved SLA is at or above the target SLA. In other words, staffing optimizer 132 performs one or more repetitions of adding an agent to the staffing schedule, performing an additional iteration of the simulation, and comparing the achieved SLA of the additional iteration to the target SLA. Staffing optimizer 132 continues in this manner until the achieved SLA meets the target SLA or the achieved SLA is above the target SLA. Staffing optimizer 132 adds the agent to the time period of the staffing schedule having the lowest performance. In one embodiment, staffing optimizer 132 identifies the time period with the lowest performance based on the time period with the lowest SLA relative to the other time periods of the staffing schedule. In the event that two or more time periods are tied for having the lowest SLA, the time period with the lowest performance is the time period of the two or more tied time periods having the highest utilization.

In step 210, staffing optimizer 132 removes an agent from the staffing schedule and reiterates the simulation until the achieved SLA is at or below the target SLA. In other words, staffing optimizer 132 performs one or more repetitions of removing an agent from the staffing schedule, performing an additional iteration of the simulation, and comparing the achieved SLA of the additional iteration to the target SLA. Staffing optimizer 132 continues in this manner until the achieved SLA meets the target SLA or the achieved SLA is below the target SLA. Staffing optimizer 132 removes the agent from the time period of the staffing schedule having the highest performance. In one embodiment, staffing optimizer 132 identifies the time period with the highest performance based on the time period with the highest SLA relative to the other time periods of the staffing schedule. In the event that two or more time periods are tied for having the highest SLA, the time period with the highest performance is the time period of the two or more tied time periods having the lowest utilization.

In step 212, staffing optimizer 132 determines the target staffing schedule based on the current iteration. Staffing optimizer 132 determines the target staffing schedule based on the staffing schedule of the current (i.e., latest) iteration of the simulation. The staffing schedule of the current iteration reflects the adjustment made during the most recent repetition of step 208 or step 210.

In decision 214, staffing optimizer 132 determines whether the target SLA is met. If staffing optimizer 132 determines that the target SLA is met (decision 214, YES branch), then staffing optimizer 132 determines the target staffing schedule based on the current iteration of the simulation (step 212). If staffing optimizer 132 determines that the target SLA is not met (decision 214, NO branch), then staffing optimizer 132 determines the target staffing schedule based on the previous iteration of the simulation (step 216).

In step 216, staffing optimizer 132 determines the target staffing schedule based on the previous iteration of the simulation. Staffing optimizer 132 determines the target staffing schedule based on the staffing schedule of the previous iteration of the simulation. The staffing schedule of the previous iteration is the staffing schedule without the change to the staffing schedule made by the most recent repetition of step 208 or step 210.

Figure 3:
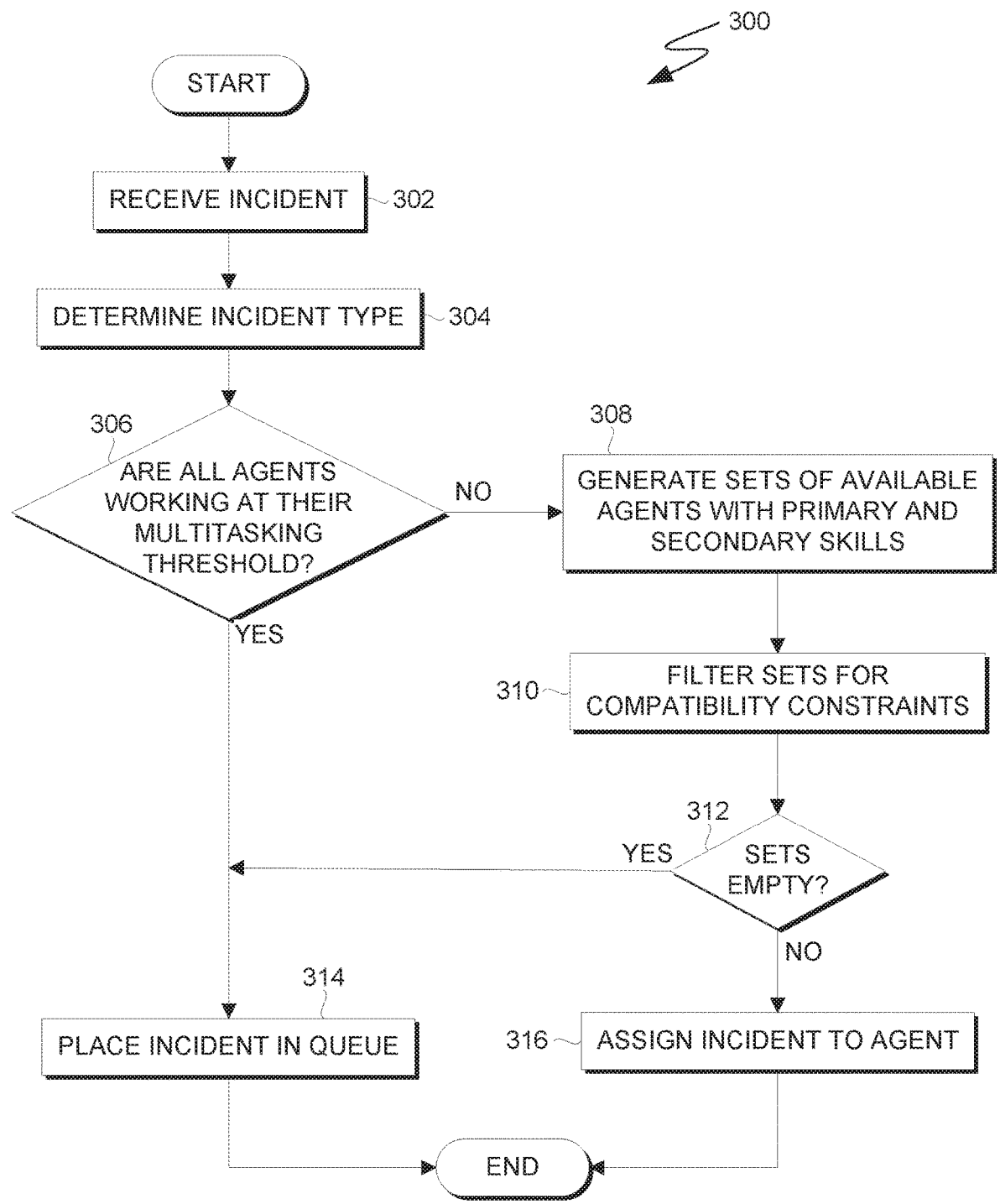
FIG. 3 is a flowchart depicting operations for dispatching received incidents, within the computing environment of FIG. 1, in accordance with an embodiment of the present disclosure.

FIG. 3 is a flowchart depicting operations for dispatching received incidents within the computing environment of FIG. 1, in accordance with an embodiment of the present disclosure. For example, FIG. 3 is a flowchart depicting operations 300 of incident dispatcher 134, on server 130 within computing environment 100.

In step 302, incident dispatcher 134 receives an incident. The incident is one of a plurality of incidents identified by the incident data of database 136. The incident has an arrival time, an incident type, and one or more requirements. In one embodiment, incident dispatcher 134 receives the incident from staffing optimizer 132. For example, staffing optimizer 132 issues incidents to incident dispatcher 134 at times within a simulation corresponding to arrival times of the incidents.

In step 304, incident dispatcher 134 determines the incident type. In one embodiment, incident dispatcher 134 determines that the incident requires a bridge call. In another embodiment, incident dispatcher 134 determines what skillsets the agent will require in order to support the incident, based on the requirements of the incident. For example, incident dispatcher 134 determines that an incident requires proficiency in a particular language and a particular technology.

In decision 306, incident dispatcher 134 determines whether all agents are working at their multitasking threshold. Incident dispatcher 134 determines whether an agent is working at the agent's multitasking threshold if the number of incidents assigned to the agent equals the agent's multitasking threshold, in which case the agent is unavailable and cannot accept new incidents. If a number of assigned incidents of an agent is less than the multitasking threshold of the agent, then the agent is considered available. If at least one agent is available, then incident dispatcher 134 determines that not all agents are working at their multitasking threshold (decision 306, NO branch). If all agents are working at their multitasking threshold (decision 306, YES branch), then incident dispatcher 134 places the incident in a queue (step 314). If all agents are not working at their multitasking threshold (decision 306, NO branch), then incident dispatcher 134 generates a set of available agents with primary skills and a set of available agents with secondary skills required to support the incident (step 308).

In step 308, incident dispatcher 134 generates one or more sets of available agents who have skills (e.g., primary skills or secondary skills) that meet the requirements of the incident. Each set of available agents includes zero or more agents. Incident dispatcher generates each set by comparing the primary skills and secondary skills of each available agent to the requirements of the incident. The skills of an agent meet the requirements of an incident if each requirement of the incident matches a skill of the agent. An available agent that has skills that meet the requirements of an incident may also have skills that do not match a requirement of the incident. For example, an incident may require proficiency is one language and an agent having skills that meet the requirements of the incident may have proficiency in that language and in a second language. Incident dispatcher 134 generates one set of available agents for each level of skills. An available agent is a member of the set of available agents that corresponds to the level of skill of the lowest matching skill of the agent. For example, incident dispatcher 134 generates a first set of available agents for a primary skill level and a second set of available agents for a secondary skill level. The agents in the first set have primary skills that meet the requirements of the incident. The agents in the second set have primary skills or secondary skills that meet the requirements of the incident.

In step 310, incident dispatcher 134 filters the sets of available agents based on business requirements. In one embodiment, incident dispatcher 134 filters the sets based on constraints described by the business requirements of database 136. An agent of a set who does not meet the constraints is removed from the set. For example, business requirements may describe a constraint under which an agent may handle at most one bridge call. In this case, an agent of the set of available agents with primary skills that meet the requirements of an incident but who is currently handling a bridge call is filtered (i.e., removed) from the set of available agents.

In decision 312, incident dispatcher 134 determines whether the sets of available agents are empty. Incident dispatcher 134 determines that a set is empty if the number of agents in the set is zero. If incident dispatcher 134 determines that all of the sets are empty (decision 312, YES branch), then incident dispatcher 134 places the incident in a queue (step 314). If incident dispatcher 134 determines that the sets are not empty (decision 312, NO branch), then incident dispatcher assigns the incident to an agent (step 316).

In step 314, incident dispatcher 134 places the incident in a queue. The queue includes zero or more incidents that have been received, but for which no agent with skills that meet the requirements of the incident is available. Incidents in the queue may be assigned to an agent at a later time, as explained in further detail in connection with FIG. 4. In some embodiments, the performance results include a TTO. In this case, a waiting time for an incident is a measure of the total time an incident spends in the queue. For example, the waiting time is the time elapsed from when incident dispatcher 134 places the incident in the queue until the time that incident dispatcher 134 assigns the incident to an agent.

In step 316, incident dispatcher 134 assigns an agent to handle the incident. In one embodiment, incident dispatcher 134 assigns an agent based on the level of skill of each set of available agents. For example, incident dispatcher 134 assigns an agent from a set of available agents that has the highest level of skill relative to the sets of available agents that are not empty. In some embodiments, incident dispatcher 134 assigns an agent further based on a modified LIAR policy. The modified LIAR policy specifies a set of priorities according to which incident dispatcher 134 assigns an agent. The modified LIAR policy prioritizes lower numbers of assigned cases and higher levels of skill. Further, among agents who are idle (i.e., who have zero assigned cases), the modified LIAR policy prioritizes assignment of an agent having spent the longest time idle. Further still, among agents who are not idle (i.e., who have one or more assigned cases), the modified LIAR policy prioritizes assignment of an agent having a longer time elapsed since the agent was assigned an incident. In one embodiment, incident dispatcher 134 applies the modified LIAR policy. Incident dispatcher 134 assigns an agent having fewer assigned incidents before an agent having more assigned incidents, regardless of skill level of each agent. Among agents having the same number of assigned incidents, incident dispatcher 134 assigns an agent with a higher skill level before an agent having a lower skill level. Among agents having the same number of assigned incidents and the same skill level, incident dispatcher 134 assigns an agent having a longer idle time before an agent having a shorter idle time (or an agent having a longer time since the agent was assigned a case over an agent having a shorter time since the agent was assigned a case).

FIG. 4 is a flowchart depicting operations for dispatching incidents within the computing environment of FIG. 1, in accordance with an embodiment of the present disclosure. For example, FIG. 4 is a flowchart depicting operations 400 of incident dispatcher 134, on server 130 within computing environment 100.

In step 402, incident dispatcher 134 identifies an agent that completed an incident. In one embodiment, incident dispatcher 134 (or, alternatively, staffing optimizer 132) determines the performance results for the completed incident. In this case, the performance results are recorded (e.g., to database 136). Further, the completed incident is unassigned from the agent.

In decision 404, incident dispatcher 134 determines whether any incidents in the queue match a skillset of the agent. In some embodiments, incident dispatcher 134 maintains a skillset queue for each skillset of an agent. For example, incident dispatcher maintains a primary queue for a primary skillset of an agent and a secondary queue for a secondary skillset of the agent. Each skillset queue includes those incidents placed in a queue in step 314 that match the corresponding skillset of the agent. In this case, incident dispatcher 134 determines whether any incidents in the queue match the skillset of an agent based on whether there are any incidents in the agent's skillset queue or queues. In other embodiment, incident dispatcher 134 determines whether any incidents in the queue match a skillset of the agent by comparing the skills of the agent to the requirements of the incidents placed in a queue in step 314. Incident dispatcher 134 identifies zero or more incidents for which the agent is qualified. If incident dispatcher 134 identifies zero incidents for which the agent is qualified among the queued incidents, then incident dispatcher 134 determines that there are no incidents in the queue that match the skillset of the agent (decision 404, NO branch). If incident dispatcher 134 determines that there are no incidents in the queue that match the skillset of the agent (decision 404, NO branch), then incident dispatcher determines whether the agent is supporting any incidents (decision 408). If incident dispatcher 134 determines that there is at least one incident in the queue that matches the skillset of the agent (decision 404, YES branch), then incident dispatcher 134 determines whether the agent is compatible with at least one identified incident (decision 406).

In decision 406, incident dispatcher 134 determines whether the agent is compatible with at least one incident identified in decision 404. Incident dispatcher 134 determines whether an agent is compatible with an incident based on the business constraints of database 136. For example, business constraints may limit the number of incidents requiring voice communications to one concurrent incident. In this example, incident dispatcher 134 determines that an agent is compatible with an incident based on whether the agent is currently handling another incident requiring voice communications. If incident dispatcher 134 determines that the agent is not compatible with at least one identified incident (decision 406, NO branch), then incident dispatcher 134 determines whether the agent is supporting any incidents (decision 408). If incident dispatcher 134 determines that there is at least one identified incident for which the agent meets the business constraints (decision 406, YES branch), then incident dispatcher 134 assigns a compatible incident to the agent (step 414).

In decision 408, incident dispatcher 134 determines whether an agent is supporting any incidents. If incident dispatcher 134 determines that the agent is supporting at least one incident (decision 408, YES branch), then incident dispatcher 134 updates the agent's status (step 412). If incident dispatcher 134 determines that the agent is not supporting at least one incident (decision 408, NO branch), then incident dispatcher 134 identifies the agent as idle (step 410).

In step 412, incident dispatcher 134 updates the status of an agent. In one embodiment, incident dispatcher 134 identifies that the agent is supporting one fewer incidents than the agent was supporting prior to completing an incident. In other words, incident dispatcher 134 decrements a count of incidents concurrently being handled by the agent.

In step 414, incident dispatcher 134 assigns an incident to the agent. If incident dispatcher 134 identified more than one incident that met the compatibility requirements (as analyzed in decision 406), incident dispatcher 134 assigns the incident that has been in the queue for the longest amount of time among those incidents for which the agent has the highest required skill.

FIG. 5 is a block diagram of components of a computing device, generally designated 500, in accordance with an embodiment of the present disclosure. In one embodiment, computing device 500 is representative of server 130 within computing environment 100, in which case server 130 includes staffing optimizer 132, incident dispatcher 134, and database 136.

It should be appreciated that FIG. 5 provides only an illustration of one implementation and does not imply any limitations with regard to the environments in which different embodiments may be implemented. Many modifications to the depicted environment may be made.

Computer system 500 includes processor(s) 502, cache 506, memory 504, persistent storage 510, input/output (I/O) interface(s) 512, communications unit 514, and communications fabric 508. Communications fabric 508 provides communications between cache 506, memory 504, persistent storage 510, communications unit 514, and input/output (I/O) interface(s) 512. Communications fabric 508 can be implemented with any architecture designed for passing data and/or control information between processors (such as microprocessors, communications and network processors, etc.), system memory, peripheral devices, and any other hardware components within a system. For example, communications fabric 508 can be implemented with one or more buses or a crossbar switch.

Memory 504 and persistent storage 510 are computer readable storage media. In this embodiment, memory 504 includes random access memory (RAM). In general, memory 504 can include any suitable volatile or non-volatile computer readable storage media. Cache 506 is a fast memory that enhances the performance of processor(s) 502 by holding recently accessed data, and data near recently accessed data, from memory 504.

Program instructions and data used to practice embodiments of the present invention may be stored in persistent storage 510 and in memory 504 for execution by one or more of the respective processor(s) 502 via cache 506. In an embodiment, persistent storage 510 includes a magnetic hard disk drive. Alternatively, or in addition to a magnetic hard disk drive, persistent storage 510 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 510 may also be removable. For example, a removable hard drive may be used for persistent storage 510. Other examples include optical and magnetic disks, thumb drives, and smart cards that are inserted into a drive for transfer onto another computer readable storage medium that is also part of persistent storage 510.

Communications unit 514, in these examples, provides for communications with other data processing systems or devices. In these examples, communications unit 514 includes one or more network interface cards. Communications unit 514 may provide communications through the use of either or both physical and wireless communications links. Program instructions and data used to practice embodiments of the present invention may be downloaded to persistent storage 510 through communications unit 514.

I/O interface(s) 512 allows for input and output of data with other devices that may be connected to each computer system. For example, I/O interface(s) 512 may provide a connection to external device(s) 516 such as a keyboard, keypad, a touch screen, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 510 via I/O interface(s) 512. I/O interface(s) 512 also connect to display 518.

Display 518 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing allocation of multi-tasking servers, the method comprising:
   receiving, by one or more processors, a schedule that identifies a plurality of time periods, wherein the schedule associates each server of a plurality of servers with at least one time period;

determining, by one or more processors, one or more performance characteristics of each server of the plurality of servers, wherein the one or more performance characteristics include a multitasking threshold, a primary function operable by the server, and a secondary function operable by the server;

performing, by one or more processors, a simulation of the plurality of servers to determine a service level of the simulation by:
  receiving, by one or more processors, a workload identifying a plurality of incidents;
  allocating, by one or more processors, each incident of the plurality of incidents to a server of the plurality of servers;
  determining, by one or more processors, one or more performance metrics of each time period of the plurality of time periods; and
  determining, by one or more processors, the service level of the simulation, based, at least in part, on the one or more performance metrics of each time period; and optimizing, by one or more processors, the schedule, based, at least in part, on determining, by one or more processors, that a service level is less than a target service level and, in response, adding, by one or more processors, a first server to a first time period of the schedule by:
  identifying, by one or more processors, a first time period of the plurality of time periods, wherein the first time period has a service level less than a service level of each other time period of the plurality of time periods;
  modifying, by one or more processors, the schedule by adding an association between the first server and the first time period; and
  performing, by one or more processors, at least one additional iteration of the simulation to determine a service level of each additional iteration.

2. The method of claim 1, wherein allocating each incident further comprises:
  receiving, by one or more processors, an incident having at least one of an incident type and a set of requirements;
  determining, by one or more processors, that at least one server is not working at capacity, and in response, generating, by one or more processors, at least one set of available servers having a skillset that matches the set of requirements of the incident; and
  filtering, by one or more processors, each of the at least one set of available servers for compatibility constraints.

3. The method of claim 2, wherein the compatibility constraints specify a limit to a number of incidents of a particular incident type that a server is allowed to concurrently handle.

4. The method of claim 2, further comprising:
  determining, by one or more processors, that the at least one set of available servers is not empty and, in response, assigning, by one or more processors, the incident to a server of the at least one set of available servers.

5. The method of claim 4, wherein the server to which the incident is assigned is selected based, at least in part, on at least one of a modified longest idle agent routing policy, a level of each skillset of each server of the at least one set of available servers, and a number of assigned incidents of each server of the at least one set of available servers.

6. The method of claim 1, further comprising:
  determining, by one or more processors, the multitasking threshold of a first server of the plurality of servers based on historical performance data that identifies a number of concurrent incidents handled by the first server; and
  updating, by one or more processors, the multitasking threshold of the first server based on a number of concurrent incidents handled by the first server during the simulation.

7. A computer program product for optimizing allocation of multi-tasking servers, the computer program product comprising:
  a computer readable storage medium and program instructions stored on the computer readable storage medium, the program instructions comprising:
    program instructions to receive a schedule that identifies a plurality of time periods, wherein the schedule associates each server of a plurality of servers with at least one time period;
    program instructions to determine one or more performance characteristics of each server of the plurality of servers, wherein the one or more performance characteristics include a multitasking threshold, a primary function operable by the server, and a secondary function operable by the server;
    program instructions to perform a simulation of the plurality of servers to determine a service level of the simulation comprising:
      program instructions to receive a workload identifying a plurality of incidents;
      program instructions to allocate each incident of the plurality of incidents to a server of the plurality of servers;
      program instructions to determine one or more performance metrics of each time period of the plurality of time periods; and
      program instructions to determine the service level of the simulation, based, at least in part, on the one or more performance metrics of each time period; and
    program instructions to optimize the schedule, based, at least in part, on determining, by one or more processors, that a service level is less than a target service level and, in response, adding, by one or more processors, a first server to a first time period of the schedule by:
      identifying, by one or more processors, a first time period of the plurality of time periods, wherein the first time period has a service level less than a service level of each other time period of the plurality of time periods;
      modifying, by one or more processors, the schedule by adding an association between the first server and the first time period; and
      performing, by one or more processors, at least one additional iteration of the simulation to determine a service level of each additional iteration.

8. The computer program product of claim 7, wherein the program instructions to allocate each incident further comprise:
  program instructions to receive an incident having at least one of an incident type and a set of requirements;
  program instructions to determine that at least one server is not working at capacity, and in response, generate at least one set of available servers having a skillset that matches the set of requirements of the incident; and program instructions to filter each of the at least one set of available servers for compatibility constraints.

9. The computer program product of claim 8, wherein the compatibility constraints specify a limit to a number of incidents of a particular incident type that a server is allowed to concurrently handle.

10. The computer program product of claim 8, wherein the program instructions further comprise:
program instructions to determine that the at least one set of available servers is not empty and, in response, assign the incident to a server of the at least one set of available servers.

11. The computer program product of claim 10, wherein the server to which the incident is assigned is selected based, at least in part, on at least one of a modified longest idle agent routing policy, a level of each skillset of each server of the at least one set of available servers, and a number of assigned incidents of each server of the at least one set of available servers.

12. The computer program product of claim 7, wherein the program instructions further comprise:
program instructions to determine the multitasking threshold of a first server of the plurality of servers based on historical performance data that identifies a number of concurrent incidents handled by the first server; and
program instructions to update the multitasking threshold of the server based on a number of concurrent incidents handled by the server during the simulation.

13. A computer system for optimizing allocation of multitasking servers, the computer system comprising:
one or more computer processors;
one or more computer readable storage media;
program instructions stored on the computer readable storage media for execution by at least one of the one or more processors, the program instructions comprising:
program instructions to receive a schedule that identifies a plurality of time periods, wherein the schedule associates each server of a plurality of servers with at least one time period;
program instructions to determine one or more performance characteristics of each server of the plurality of servers, wherein the one or more performance characteristics include a multitasking threshold, a primary function operable by the server, and a secondary function operable by the server;
program instructions to perform a simulation of the plurality of servers to determine a service level of the simulation comprising:
program instructions to receive a workload identifying a plurality of incidents;
program instructions to allocate each incident of the plurality of incidents to a server of the plurality of servers;
program instructions to determine one or more performance metrics of each time period of the plurality of time periods; and program instructions to determine the service level of the simulation, based, at least in part, on the one or more performance metrics of each time period; and
program instructions to optimize the schedule, based, at least in part, on determining, by one or more processors, that a service level is less than a target service level and, in response, adding, by one or more processors, a first server to a first time period of the schedule by:
identifying, by one or more processors, a first time period of the plurality of time periods, wherein the first time period has a service level less than a service level of each other time period of the plurality of time periods;
modifying, by one or more processors, the schedule by adding an association between the first server and the first time period; and
performing, by one or more processors, at least one additional iteration of the simulation to determine a service level of each additional iteration.

14. The computer system of claim 13, wherein the program instructions to allocate each incident further comprise:
program instructions to receive an incident having at least one of an incident type and a set of requirements;
program instructions to determine that at least one server is not working at capacity, and in response, generate at least one set of available servers having a skillset that matches the set of requirements of the incident; and
program instructions to filter each of the at least one set of available servers for compatibility constraints.

15. The computer system of claim 14, wherein the compatibility constraints specify a limit to a number of incidents of a particular incident type that a server is allowed to concurrently handle.

16. The computer system of claim 14, wherein the program instructions further comprise:
program instructions to determine that the at least one set of available servers is not empty and, in response, assign the incident to a server of the at least one set of available servers.

17. The computer system of claim 16, wherein the server to which the incident is assigned is selected based, at least in part, on at least one of a modified longest idle agent routing policy, a level of each skillset of each server of the at least one set of available servers, and a number of assigned incidents of each server of the at least one set of available servers.

18. The computer system of claim 13, wherein the program instructions further comprise:
program instructions to determine the multitasking threshold of a first server of the plurality of servers based on historical performance data that identifies a number of concurrent incidents handled by the server; and
program instructions to update the multitasking threshold of the server based on a number of concurrent incidents handled by the server during the simulation.

* * * * *